Feb. 6, 1951 — C. S. KELLEY — 2,540,739
ADJUSTING APPARATUS FOR LOAD COMPENSATING BRAKE EQUIPMENT
Filed Nov. 26, 1947
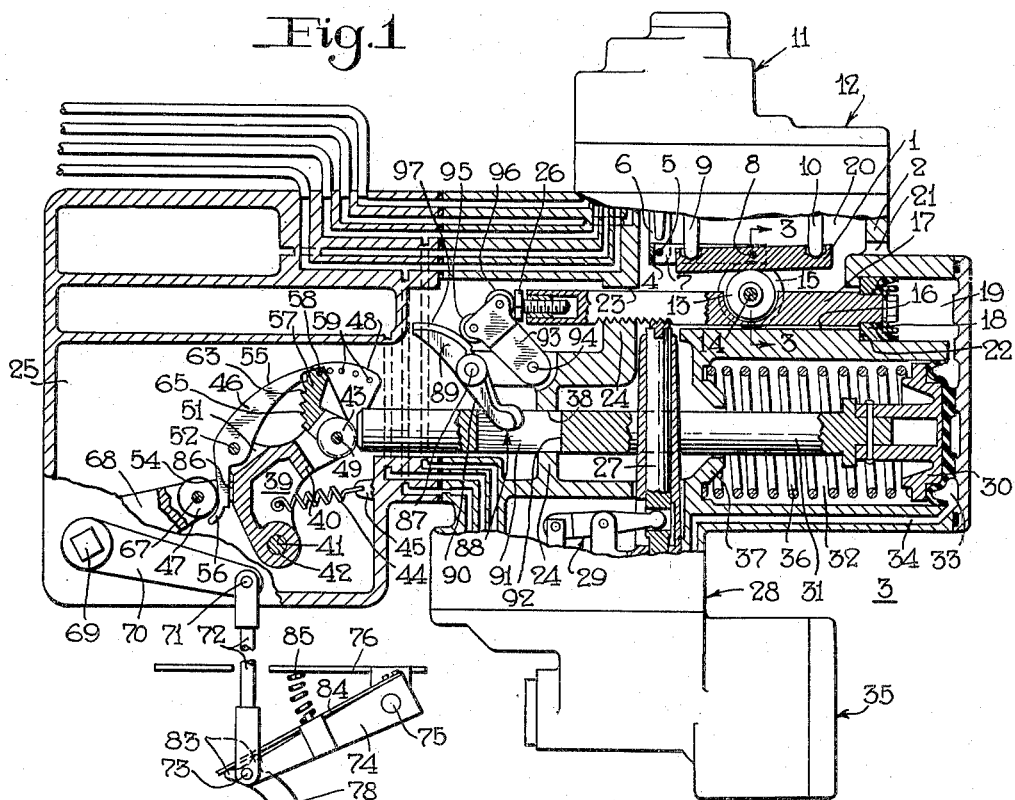
Fig.1
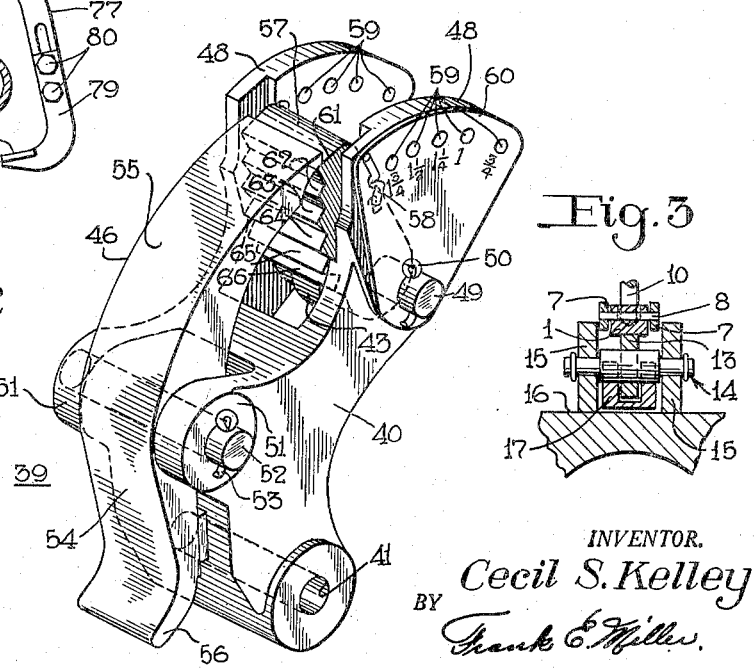
Fig.2
Fig.3
INVENTOR.
Cecil S. Kelley
BY Frank E. Miller
ATTORNEY Patented Feb. 6, 1951

2,540,739

UNITED STATES PATENT OFFICE 2,540,739

ADJUSTING APPARATUS FOR LOAD COMPENSATING BRAKE EQUIPMENT

Cecil S. Kelley, Forest Hills, Pa., assignor to The Westinghouse Air Brake Company, Wilmerding, Pa., a corporation of Pennsylvania Application November 26, 1947, Serial No. 788,130

10 Claims. (Cl. 303—22)

1

This invention relates to load compensating brake equipment for a vehicle and more particularly to adjusting apparatus embodied in a compensating valve device comprised in said equipment.

In the copending application of A. J. Bent, Serial No. 787,014, filed November 19, 1947, and assigned to the assignee of the present application, there is disclosed adjusting apparatus embodied in a load compensating valve device for a load compensating brake equipment of the type employing a so-called compensating brake cylinder device having at one side of the piston therein the usual pressure chamber to which fluid under pressure is adapted to be supplied by operation of the well known AB brake controlling valve device or the like for applying the brakes on a railway vehicle. At the opposite side of the brake cylinder piston is a compensating pressure chamber to which fluid under pressure is adapted to be supplied by the compensating valve device to act on a smaller area of the piston, than exposed to pressure in the usual pressure chamber, for opposing the pressure in the usual pressure chamber and for thereby limiting the degree of braking the vehicle effected by pressure in the usual pressure chamber.

This compensating valve device comprises relay valve means associated with an equalizing beam held in rockable engagement with an adjustable roller fulcrum and operative in response to pressure of fluid supplied to the usual brake cylinder pressure chamber for effecting variations in pressure of fluid in the compensating pressure chamber according to variations in leverage ratio of said beam. By adjustment of the roller fulcrum to positions relative to the length of the beam, the leverage ratio of the beam may be varied, and by proper positioning of said fulcrum, this leverage ratio may be varied inversely in proportion to degree of load on the vehicle, so that the relay valve means conditioned thereby will effect variations in pressure of fluid in the brake cylinder compensating pressure chamber in the same relationship, for thereby varying the degree of braking of the vehicle in proportion to the load carried thereby.

A measuring arm is arranged to be actuated by fluid pressure means through a measuring motion into contact with the underside of an unsprung member of the vehicle to measure the degree of deflection of the body supporting springs on the vehicle, as governed by the degree of load thereon. Adjusting means linkage, connecting the fluid pressure means, the roller

2 fulcrum and the measuring arm, comprises a split or two part cam and cam lever arrangement through which movement of the measuring arm is effected and transformed to a suitable movement of the adjustable fulcrum for so positioning same relative to the equalizing beam as to effect the previously described desired relationship of leverage ratio thereof to degree of load on the vehicle. One element of the split cam, through which measuring motion of the measuring arm is effected, is adjustable to different angular positions relative to the other cam element and to the cam lever for modifying travel of the measuring arm to compensate for differences in the pick-up characteristics of the body supporting springs on different vehicles on which the equivalent may be used.

In certain of the angular positions of the adjustable cam element relative to the cam lever, the contour of said adjustable cam element relative to the contour of the other cam element may not blend so that a "dead spot" or "broken cam" effect may undesirably result, and it is therefore one object of the invention to eliminate this "broken cam" effect.

It will be observed that the split cam and cam lever arrangement serve as a medium through which the measuring arm is actuated, as well as serving to transform movement of said measuring arm to suitable adjustment of the roller fulcrum. In order to perform these two functions, the curvature of the adjustable cam element is such that in certain of its adjusted angular positions relative to the cam lever, excessive forces may be exerted on the under side of the unsprung member by the measuring arm at termination of its measuring movement as effected through said cam element. With such excessive forces, there is a tendency for false positioning of the fulcrum relative to the equalizing beam, with a consequent undesired error in pressure of fluid in the brake cylinder compensating pressure chamber effected by the relay valve means conditioned by said beam, so as to cause improper braking of the vehicle relative to the load thereon, which is undesirable.

It is therefore another object of the invention to provide adjusting apparatus for the load compensating valve device which will be free of these excessive forces.

The above objects are accomplished in the present invention by separating the two functions of the adjustable cam element in the aforementioned apparatus. The load measuring function only, for operating the measuring arm, is embodied in an adjustable cam having a continuous contour with two surface portions to take the place of the split cam arrangement in the former apparatus, thereby eliminating the "broken cam" effect.

The one portion of the adjustable cam in the present apparatus is curved, this portion corresponding to the adjustable cam element in the split cam arrangement of the previous apparatus, but instead of serving the two functions performed by the previous cam element, the curved portion of the adjustable cam in the present apparatus serves only as a medium through which the measuring motion of the measuring arm is effected, while the function of transforming motion of the measuring arm to proper positioning of the roller fulcrum is effected by a second and separate cam and lever arrangement, with the result that the contour of said curved portion may be such as will not cause excessive forces to act on the unsprung member, thereby accomplishing the second object of this invention.

Other objects and advantages of the invention will hereinafter become obvious from the following detailed description thereof.

In the accompanying drawing: Fig. 1 is a diagrammatic view, partly in outline and partly in section, of a load compensating relay valve device embodying the invention; Fig. 2 is a perspective view of an adjustable cam arrangement shown diagrammatically in Fig. 1; and Fig. 3 is a sectional view taken along line 3—3 in Fig. 1.

Description

The improved adjusting apparatus may be like that disclosed in the aforementioned Bent application except for features which will be specifically pointed out hereinafter, and comprises a casing 2 carried by a sprung part of the vehicle, and containing an equalizing member or beam 1 of a load compensating valve device 3. The beam 1 is held against longitudinal movement in the casing by a yoke 4 pivoted at one end on a pin 5 carried in arms 6 projecting from the casing. The yoke comprises two spaced apart arms 7 (Fig. 3) disposed respectively at opposite sides of the beam 1 and pivotally connected at their projecting ends by a pin 8 to the beam substantially at its mid-point, thus allowing the beam freedom for rocking movement. A relay valve stem 9 engages one end of the beam 1 in a socket formed in the upper side of the beam as viewed in the drawing, and a pilot valve stem 10 similarly engages the opposite end of the beam. The stems 9 and 10 are connected at their opposite ends to a self-lapping relay valve device 11 and a pilot device 12, respectively, both devices being shown in outline. The lower side of the beam 1 is supported on a roller fulcrum 13 which is carried by a shaft 14 midway between two opposite spaced apart rollers 15 of larger diameter than roller fulcrum 13 and which are mounted on opposite ends of the shaft and arranged to roll on a flat surface 16 in the casing. The shaft 14 is rotatably attached to a bias piston rod 17 which is reciprocable within the casing relative to the length of the beam 1. The rollers 15 and roller fulcrum 13 are so arranged with respect to the shaft 14 that as said shaft is carried relative to the length of the beam by movement of the bias piston rod 17, the roller fulcrum 13 rolls on the undersurface of said beam 1, while the rollers 15 roll on the surface 16 of the casing.

Connected to one end of the rod 17 is a bias piston 18 which is exposed to a pressure chamber 19 on its one side, and to a chamber 20 on its opposite, which latter chamber is open to atmosphere by way of a port 21 in the casing. A shoulder 22 is formed in the casing for contact by the bias piston 18 to define a stop position of the bias piston rod 17. The bias piston rod 17 extends through chamber 20 and a bore 23 in a wall 24 separating chamber 20 from a chamber 25, the wall of said bore serving to guidably support said piston rod. An adjusting screw 26 is secured to the projecting end of the bias piston rod 17 disposed in chamber 25 for reasons which will hereinafter be described.

The roller fulcrum 13 has two extreme positions with respect to the equalizing beam 1, one position being that in which it is shown in the drawing and which is defined by contact between piston 18 and shoulder 22, and in which position, which will hereinafter be referred to as its "empty" position, said fulcrum is positioned substantially midway between the pilot valve stem 10 and relay valve stem 9, which position said fulcrum will be caused to take when the vehicle or car is empty. In its other extreme position, to be hereinafter referred to as "full-load" position, the roller fulcrum will be so positioned that its line or point of contact with beam 1 will be substantially in alignment with the axis of the stem 10 with the bias piston 18 disposed adjacent to or in substantial contact with the end wall of chamber 19. The roller fulcrum will be caused to assume "full-load" position when the vehicle is fully loaded, as will be described hereinafter.

The adjusting apparatus is provided with a locking plunger 27 for locking the bias piston rod 17, and hence the roller fulcrum 13, in any particular adjusted position. The projecting end of the locking plunger is provided with teeth for engagement with corresponding teeth formed in the bias piston rod. A spring, associated with fluid pressure unlocking means disposed within a casing section 28 shown in outline, is arranged to act through linkage 29 to urge the plunger 27 into normal locking engagement with the bias piston rod.

Spaced from and extending generally parallel to the axes of the bias piston 18 and its attached rod 17 is an adjusting piston 30 and attached adjusting piston rod 31 extending from one side of said piston through a non-pressure chamber 32 which is open to chamber 20. At the opposite side of the adjusting piston 30 there is a pressure chamber 33 which is open to the bias piston pressure chamber 19 and to a passage 34, which passage is adapted to be supplied with fluid under pressure by way of control means contained in a casing portion 35 (shown in outline). A spring 36, disposed in the non-pressure chamber 32 and encircling rod 31, is interposed between a casing rib 37 and the piston 30 for urging said piston and attached rod 31 in the direction of chamber 33 toward a normal rest position, in which position they are shown in the drawing. The end of the adjusting piston rod 31 away from the piston 30 is guidably supported in a bore 38 in wall 24 and projects into the chamber 25 for operative engagement with a novel cam assemblage 39 disposed in said chamber and constituting a part of the invention.

The novel cam assemblage 39 comprises a cam lever 40 which is provided with a bore 41 for accommodating a fulcrum shaft 42 secured to the casing of the compensating valve device and located a substantial distance away from the axis of the adjusting piston rod 31. A roller follower 43 is carried by the lever 40, spaced away from the bore 41, for engagement with the projecting end of the adjusting piston rod 31, so that movement of said rod in the direction of said follower will cause the cam lever to rock in a counterclockwise direction about the pin 42, as viewed in the drawing; while a tension spring 44 attached at its one end to said cam lever and at its opposite end to a casing lug 45 biases the cam lever in the opposite direction and assures the above engagement. An adjustable cam element 46 is also carried by the cam lever 40, spaced away from the bore 41 and follower 43, for displacing a roller follower 47 as said cam lever is rocked in the counterclockwise direction.

The cam lever 40 is provided with two spaced apart parallel arms 48 between which is disposed a pin 49 extending at its opposite ends through suitable aligned bores in said arms and secured in place at each end by a cotter pin 50, or the like, inserted in a transverse opening in said shaft outside each arm. The roller follower 43 is mounted on this shaft 49 between the arms 48.

The adjustable cam element 46 is pivotally secured to the cam lever 40 between two spaced apart ribs 51 by a pin 52. The pin 52 extends through aligned bores in the ribs 51 and cam element 46 and is locked into place at each end by a cotter pin 53 or the like. The cam element 46 is provided with a continuous unbroken cam surface a portion 54 of which is substantially flat and a portion 55 of which is curved and preferably of single radius. One end of the cam element 46 is provided with a curved rib 56 having a surface merging into surface portion 54, for accommodating the roller follower 47 and to act as a stop shoulder for engagement by said roller to define a normal rest position thereof. The opposite end of the cam element, on which the surface portion 55 is formed, is adapted at its under surface for engagement with an adjustable stop member 57 which is pivotally mounted on the pin 49 between the arms 48, a curved recess being formed in member 57 to accommodate the roller follower 43 also mounted on said pin.

The adjustable stop member 57 is locked in position with respect to cam lever 40 by a pin 58 or the like which extends through a bore in said member and through one pair of a plurality of oppositely aligned pairs of bores or small openings 59 in the arms 48. In each arm, the plurality of openings are spaced apart in an arc of a circle about the pin 49 with each opening in one arm in alignment with its counterpart in the other arm, so that the stop member 57 may be adjusted to a number of angular positions about pin 49 relative to cam lever 40 by removal of pin 58, and then locked in any selected one of said positions by reinsertion of said pin.

A marker plate 60 fits over the pin 49 and seats against the outer face of one cam lever arm 48. The plate 60 is provided with a plurality of small openings 59 corresponding to the openings 59 in each arm 48 and in registry therewith.

Adjacent to each opening 59 in the plate 60 is a legend designating the deflection or pick-up of a particular vehicle body supporting spring for a change in weight of the vehicle from empty to full load. By way of example, there are six of these openings 59 in plate 60 designated by legends varying from 2″ to ¾″, indicating that the stop member 57 may take six different corresponding angular positions on the cam lever 40 to agree with respective body supporting springs having six different full load deflections on respective vehicles with which the brake equipment may be associated, for reasons which will hereinafter become obvious. When the brake equipment is applied to a vehicle, the pin 58 will be placed in a pair of aligned openings 59 in the lever arms 48 and plate 60 which bears the legend corresponding to the full load deflection of the body supporting springs on that particular vehicle.

The stop member 57 is provided along its face adjacent to the cam element 46 with a plurality of stepped stop shoulders 61 to 66 inclusive, extending from the projecting end of said member inwardly toward the end thereof connected to pin 49. The number of stop shoulders corresponds to the number of angular adjusted positions which the stop member 57 may be caused to assume relative to the cam lever 40. Each stop shoulder is provided for engagement by the adjacent end of cam element 46, and with the stop member 57 adjusted to any one of its six different locked positions, rocking movement of cam element 46 in a clockwise direction about pin 52 will be stopped by engagement with the respective stop shoulder. It will thus be seen that the degree of clockwise movement of cam element 46 about pin 52, and hence the resultant extreme stop position thereof, as limited by its contact with the member 57, is determined by the adjusted angular position of said member with respect to the cam lever arms 48, and is increasingly greater as said member is moved toward its position corresponding to a ¾″ body supporting spring deflection, and vice versa.

The previously mentioned roller follower 47, adapted to roll on the cam surfaces of the cam element 46, is rotatably attached at 67 to one end of a lever 68 disposed in chamber 25 and secured at its opposite end to turn with a shaft 69 journaled in the casing. A second lever 70, disposed outside the casing, is also secured at its one end to rotate with shaft 69 and at its opposite end is pin connected at 71 to one end of a relatively long pull or connecting rod 72. The opposite end of rod 72 is pin connected at 73 to one end of a lever 74, the opposite end of which lever is pin connected at 75 to a sprung part 76 of the vehicle.

A measuring arm 77 is also pin connected at 73 to the lever 74, said arm comprising upper and lower parts, 78 and 79, rigidly clamped together by lock bolts 80. The projecting end of portion 79 is provided with an offset portion or hook having a striking surface 81 for contact with the underside of an unsprung member 82 of the vehicle. At each side of the pin connection 73 the measuring arm 77 has an upstanding lug 83, the two lugs being arranged for engagement by one end of a leaf spring 84 which extends substantially parallel to and over the lever 74 and is secured at its opposite end to said lever. A bias compression spring 85 is interposed between lever 74 and the sprung part 76 of the vehicle for normally biasing the lever 74, rod 72, and levers 70 and 68 to the position in which they are shown in the drawing, under which conditions spring 84 acting on lugs 83 will hold the measuring arm 77 in a cocked rest position disposed away from the unsprung member 82. The roller follower 47 carried by lever 68 is thus urged to its rest position, as shown, in contact with the curved stop rib 56 of cam element 46, which element is in turn urged into contact with a shoulder 86 formed in cam lever 40.

In accordance with another feature of the invention, a lever 88 disposed in chamber 25 is pivotally attached, substantially at its midpoint, to a pin 87 secured to the casing intermediate the respective axes of the bias and adjusting piston rods, 17, 31. The lever 88 comprises two arms, 89 and 90, extending from opposite sides of the pin 87. The arm 90 projects into a transverse slot 91 formed in the adjusting piston rod 31. The slot 91 is of such length as to permit the lever 88 to be free on pin 87 with the adjusting piston rod 31 in its normal position in which it is shown in the drawing, and to permit a chosen extent of movement of said rod in the direction of chamber 25 before an end wall 92 of said slot engages the projecting end of lever arm 90, for reasons which will hereinafter become obvious. One end of a follower arm 93 is pin connected at 94 to the casing of the compensating valve device substantially in horizontal alignment with pin connection 87, while its opposite end carries two oppositely arranged roller followers 95 and 96 for engagement with lever arm 89 and with the adjusting screw 26 in the projecting end of bias piston rod 17, respectively.

The lever 88 is provided with a curved cam surface 97 formed along one edge of arm 89 for engagement with the follower 95, while the projecting end of arm 90 is provided with a rounded portion disposed in slot 91 in adjusting piston rod 31 for engagement with the end wall 92.

Operation

In operation, let it be assumed initially that the vehicle or car employing the load compensating brake equipment is empty; that, the bias piston chamber 19 and adjusting piston chamber 33 are void of fluid under pressure and that, therefore, the adjusting piston 30 and rod 31 are disposed in a normal rest position, under pressure of spring 36, in which position they are shown in the drawing, and the piston 30 is seated against the end wall of chamber 33. Assume further that the bias piston 18 and rod 17 have previously been so positioned as to dispose the roller fulcrum 13 in its "empty" position and that it is locked therein by stem 27; still further assume that the full-load deflection of the body supporting springs employing the equipment is 2″ and that therefore the adjustable stop member 57 in cam assemblage 39 is in its corresponding 2″ position, as shown in the drawing.

Upon supply of fluid under pressure to the bias piston chamber 19, the adjusting piston chamber 33, and the fluid pressure unlocking means contained in casing portion 28; the locking stem 27 will move out of locking engagement with the bias piston rod 17 through action of linkage 29; the bias piston rod 17 will be urged by fluid pressure in chamber 19 acting on piston 18 to the position in which it is shown in the drawing, if not already in such position, whereby the roller fulcrum 13 carried thereby will occupy its "empty" position; and the adjusting piston rod 31 will move under action of fluid pressure in chamber 33 on piston 30 against opposing action of spring 36 to a corresponding "empty" position in which the wall 92 of slot 91 therein is just in contact with the projecting end of lever arm 90, with lever arm 89 in contact with roller follower 95, and roller follower 96 in contact with adjusting screw 26. By screwing the adjusting screw 26 in or out of the end of bias piston rod 17, coincidence may be assured between the above defined "empty" position of the adjusting piston rod 31 and "empty" position of the roller fulcrum 13 as determined by position of said bias piston rod.

In moving from its normal rest position to its "empty" position into contact with lever arm 90, the adjusting piston rod 31, by contact at its projecting end with the roller follower 43 carried by cam lever 40, will rock said lever about shaft 42 in a counterclockwise direction, carrying cam element 46 with it, and will thereby cause lever follower 47 to roll on the flat surface portion 54 of said element until it reaches the intersection of said flat surface portion with the curved surface portion 55, at which point the follower 47 will then be disposed in its corresponding "empty" position to agree with that of the adjusting piston rod 31.

During movement of the roller follower 47 from its initial rest position, in which position it is shown in the drawing, to its "empty" position as above defined, the lever 68 will thereby be caused to rock in a counterclockwise direction, turning shaft 69 and lever 70 in a counterclockwise direction. Through this turning movement of lever 70, acting through pull rod 72, the lever 74 is caused to turn in a clockwise direction about its pin connection to the sprung part 76 of the vehicle at 75. This turning movement of lever 74 will bring the measuring arm 77 into contact with the side of the unsprung member 82 of the vehicle, and by sliding movement upward along the edge thereof will dispose the striking surface 81 in its "empty" position to correspond with the previously described "empty" positions of the lever follower 47 on cam element 46, the adjusting piston rod 31, and the roller fulcrum 13. At this time, under the assumed empty condition of the vehicle employing the equipment, the striking surface 81 will be in engagment with the underside of the unsprung member 82, locking the measuring arm 77, lever 74, pull rod 72, levers 70 and 68, cam assemblage 39, and adjusting piston rod 31 in position and thereby preventing further movement thereof as well as preventing movement of the bias piston rod 17 away from "empty" position, so that the roller fulcrum 13 will remain at its "empty" position to agree with the assumed empty condition of the vehicle. To assure coincidence between "empty" position of the striking surface 81 and "empty" position of the adjusting piston rod 31, etc., the length of measuring arm 77 may be adjusted, allowed by loosening and retightening bolts 80 for raising or lowering the striking surface 81 toward or away from the undersurface of the unsprung member 82, according to necessity.

Assume now that the vehicle employing the equipment and using body supporting springs having a 2″ full-load spring deflection is loaded to the full limit of its capacity. Under this full load condition of the vehicle, when the measuring arm 77 has been caused to move, as above described, to bring the striking surface 81 thereof to its "empty" position, said surface will not be in contact with the underside of the unsprung member 82, but will still be disposed away therefrom substantially a vertical distance of 2″, or in other words a distance equal to the full deflection of the body supporting springs caused by full loading on the vehicle and further movement of the adjusting piston rod 31 will therefore not be prevented, so that said rod will continue to move from its "empty" position in the direction of chamber 25. This further movement of the adjusting piston rod 31 in the direction of chamber 25, will cause the cam assemblage 39 to rock further in a counterclockwise direction about shaft 42, causing follower 47 to roll onto the curved surface portion 55 of cam element 46, and rock said element in a clockwise direction about pin 52 relative to cam lever 40, until the underside of the projecting end of said cam element engages shoulder 61 of the adjustable stop member 57, following which the follower 47 will continue to be displaced by cam element 46 until the striking surface 81 engages the underside of the unsprung member 82, defining its "full-load" position, and thus preventing further movement of the adjusting piston rod 31 in the direction of chamber 25, as will be understood from previous description. At this time the adjusting piston rod 31 will be in its "full-load" position in agreement with the position of the measuring arm surface 81.

As the adjusting piston 30 is moved from its "empty" to its "full-load" position, the engagement of the end wall 92 of slot 91 in the adjusting piston rod 31 with the projecting end of the arm 90 of lever 88 will rock said lever in a clockwise direction about pin 87. This rocking movement of lever 88 will cause follower 95 to roll outwardly along the length of cam surface 97 of arm 89 of said lever and thereby rock follower arm 93 about its pin connection at 94 in a clockwise direction, and through movement of roller follower 96 carried by said arm and held in engagement with adjusting screw 26, will cause the bias piston rod 17 and roller fulcrum 13 to be moved from "empty" position to "full-load" position of said fulcrum substantially beneath the pilot stem 10 to agree with the assumed full-load condition of the vehicle.

With different full-load deflections or pick-up values of the body supporting springs on various vehicles which may employ the load compensating brake equipment, travel of the measuring arm surface 81 between its "empty" position and "full-load" position, as the load on a particular vehicle varies from no-load to full-load, will change according to the full-load deflection of the particular body supporting springs. This latter travel may vary, for example, from 2" on one vehicle, to ¾" on another vehicle, in accordance with the different pick-up characteristics of the body supporting springs on these different vehicles. With these different body supporting spring pick-up values, full travel of adjusting piston rod 31 between its "empty" and "full-load" positions, as previously defined, is maintained constant however by changing the effective displacement of the cam assemblage 39, thereby changing the extent of movement of the measuring arm 77, effected through said cam assemblage, to agree with these pick-up values.

For example, by adjusting the adjustable stop member 57, from its 2" position to its 1¾", 1½", 1¼", 1", or ¾" position, to agree with corresponding full-load spring pick-up on various vehicles, the travel of the adjusting piston rod 31 and the cam lever 40 will not change. However, lever follower 47 upon rolling onto the curved surface portion 55 of cam element 46 will cause said element to rock on pin 52 in a clockwise direction relative to said cam lever to a retracted stop position defined by engagement with the respective shoulder 61, 62, 63, 64, 65 or 66 on the adjustable member 57, so that as the fixed rocking movement of said cam lever 39 carries cam element 46 with it through said movement to its particular stop position against member 57, the roller follower 47 will be displaced a correspondingly different amount, to thus change the travel of the measuring arm 77 to agree with the full-load spring deflection on the various vehicle.

The curvature of the curved surface portion 55 of the cam element 46 is such that in all of its adjustable angular stop positions relative to the cam lever 40, from its 2" position to its ¾" position, the movement of the adjusting piston 31 from its "empty" position as limited by contact between the measuring arm surface 81 with the unsprung member 82, will be proportional to the degree of load on the vehicle, from full-load to empty. For example, for any particular stop position of the cam element 46, as determined by the locked position of the adjustable stop member 57, in accord with the full-load spring deflection of the vehicle body supporting springs, if the vehicle is loaded one-half or fifty percent of its full-load capacity, the measuring arm surface 81 will be caused to move through action of the adjusting piston rod 31 on cam assemblage 39, one-half or fifty percent of its possible full-travel between its "empty" and full-load" positions, before striking the undersurface of the unsprung member 82, and said adjusting piston rod will thereby be limited to movement half way between its "empty" and "full-load" positions, regardless of the pick-up of the particular body supporting springs.

As movement of the adjusting piston rod 31 from its "empty" position in the direction of its "full-load" position, as previously described, is limited to a certain percentage of its fixed full travel in accordance with the same certain percentage of full-load on the vehicle, and regardless of the pick-up characteristic of the body supporting springs, the movement of the bias piston rod 17 and roller fulcrum 13 are likewise limited, but to a different percentage of their fixed full travel between "empty" and "full-load" positions of said roller fulcrum relative to the equalizing beam 1, in order that the leverage ratio of said beam will be proper for the degree of load on said vehicle for proper conditioning of the relay valve device 1.

More specifically, it will be noted that in "empty" position of the roller fulcrum it is disposed substantially midway between the pilot and relay stems 10 and 9 respectively to provide a 1:1 ratio of leverage arms of beam 1. In "full-load" position, the roller fulcrum will be disposed substantially beneath the pilot stem 10 to prevent operation of beam 1 by pilot stem 10, while for a one-half load, the roller fulcrum, to provide a desired 1:2 ratio, will not be disposed midway between "empty" and "full-load" positions thereof, but instead, will be positioned only about one third of the distance away from "empty" position to "full-load" position. In other words, in order to obtain the proper positioning of the roller fulcrum for different degrees of load on the vehicle, it cannot be moved by the adjusting piston in increments directly proportional to increments of movement of said adjusting piston.

The desired proper positioning of the roller fulcrum 13 for different positions of the adjusting piston 30 between its "empty" and "full-load" positions is therefore effected through rocking movement of the follower arm 93 as the roller follower 95 carried thereby is caused to roll on cam surface 97 of lever 88 as said lever is rocked by movement of said adjusting piston, as was previously described. Roller follower 95 in traveling along the cam surface 97 will cause the roller fulcrum 13 to travel toward its "full-load" position distances which increase at an increasing rate to effect the proper positioning of said fulcrum to agree with load on the vehicle. The contour of cam surface 97, it can be said, is substantially such that will cause the arm 93 to rock about pin connection 94 in such a manner as will effect the desired positioning of roller fulcrum 13 according to movement of adjusting piston rod 31 and hence according to the degree of load on the vehicle.

Upon release of fluid under pressure from bias and adjusting piston chambers 19, 33 and the fluid pressure unlocking means contained in casing portion 28, the locking stem 27 will reengage the bias piston rod 17 to lock it and the roller fulcrum 13 carried thereby in any particular adjusted position thereof, following which the spring 36 will return the adjusting piston 30 and attached rod 31 to rest position in which position they are shown in the drawing, allowing the other parts of the apparatus, including the measuring arm 17, to also so return.

*Summary*

It will now be seen that an improved adjusting apparatus for a load compensating valve device has been provided which eliminates the undesirable "broken cam" effect inherent in the aforementioned apparatus, and in which the force exerted on the unsprung member 82 during an adjusting operation is limited to an acceptable degree. The improved apparatus also comprises an adjustable cam assemblage which greatly facilitates adjustment thereof to agree with the pick-up characteristic of the body supporting springs on a particular vehicle on which the load compensating brake equipment is to be installed.

Having now described the invention, what I claim is new and desire to secure by Letters Patent is:

1. In a load compensating brake equipment for a vehicle having an unsprung part and a load carrying sprung part adjustable vertically relative to said unsprung part in direct proportion to the degree of said load, the combination with a measuring arm carried by said sprung part and adapted to measure the distance of said sprung part from said unsprung part between first and second positions corresponding to empty and full-load conditions of the vehicle and having an initial movement relative to said unsprung part from a normal position to said first position, a fulcrumed member carried by said sprung part, a rockable cam element fulcrumed on said member and having a first cam surface at one side of the cam fulcrum for effecting said relative movement of said measuring arm and having a second and aligned cam surface at the opposite side of the cam fulcrum for effecting movement of said measuring arm from said first position to said second position, a fixed stop engageable by said cam element to render said first cam surface effective, an adjustable stop engageable by said cam element for rendering said second cam surface effective, a fluid pressure actuated piston for actuating said fulcrumed member and thereby said measuring arm, and means adjustable by said piston for governing the degree of braking of said vehicle.

2. In a load compensating brake equipment for a vehicle having an unsprung part and a load carrying sprung part adjustable vertically relative to said unsprung part in direct proportion to the degree of said load, the combination with a measuring arm carried by said sprung part and adapted to measure the distance of said sprung part from said unsprung part between first and second positions corresponding to empty and full-load conditions of the vehicle and having an initial movement relative to said unsprung part from a normal position to said first position, a fulcrumed member carried by said sprung part, a rockable cam element fulcrumed on said member and having a first cam surface at one side of the cam fulcrum for effecting said relative movement of said measuring arm and having a second and aligned cam surface at the opposite side of the cam fulcrum for effecting movement of said measuring arm from said first position to said second position, said fulcrumed member comprising means engageable by said cam element for rendering said first cam surface effective, a stop element carried by said fulcrumed member for rendering said second cam surface effective and adjustable to vary the displacement of said second cam surface, a fluid pressure actuated piston for actuating said fulcrumed member, and means adjustable by said piston for governing the degree of braking of said vehicle.

3. In a load compensating brake equipment for a vehicle having an unsprung part and a load carrying sprung part adjustable vertically relative to said unsprung part in direct proportion to the degree of said load, the combination with a measuring arm carried by said sprung part and adapted to measure the distance of said sprung part from said unsprung part between first and second positions corresponding to empty and full-load conditions of the vehicle and having an initial movement relative to said unsprung part from a normal position to said first position, a fulcrumed member carried by said sprung part, a rockable cam element fulcrumed in said member and having a first cam surface at one side of the cam fulcrum and a second cam surface at the opposite side, means connecting said measuring arm to said fulcrumed member comprising a follower for engaging said cam surfaces and displaceable by said first cam surface for actuating said arm from said normal position to said first position and displaceable by said second cam surface for actuating said arm from said first position to said second position, said fulcrumed member comprising fixed means for supporting said cam element to render said first cam surface effective, a stop element carried by said fulcrumed member to render said second cam surface effective, and adjustable to vary the displacement of said second cam surface, a fluid pressure actuated piston for operating said fulcrumed member, and brake regulating means for the vehicle adjustable by said piston.

4. In a load compensating brake equipment for a vehicle having an unsprung part and a load carrying sprung part adjustable vertically relative to said unsprung part in direct proportion to the degree of said load, the combination with a measuring arm carried by said sprung part and adapted to measure the distance of said sprung part from said unsprung part between first and second positions corresponding to empty and full-load conditions of the vehicle and having an initial movement relative to said unsprung part from a normal position to said first position, a fulcrumed member carried by said sprung part, a rockable cam element fulcrumed on said member and having a first cam surface at one side of the cam fulcrum and a second cam surface at the opposite side, means connecting said measuring arm to said fulcrumed member comprising a follower for engaging said cam surfaces and displaceable by said first cam surface for actuating said arm from said normal position to said first position and displaceable by said second cam surface for actuating said arm from said first position to said second position, said fulcrumed member comprising fixed means for supporting said cam element to render said first cam surface effective, a stop member fulcrumed in said fulcrumed member for engagement by said cam element to render said second surface effective and adjustable to vary the throw of said second cam surface, means carred by said fulcrumd member for locking said stop member in an adjusted position, fluid pressure actuated piston means for actuating said fulcrumed member, and brake regulating means for said vehicle operable by said piston in moving said measuring arm between said first and second positions.

5. In a load compensating brake equipment for a vehicle having an unsprung part and a load carrying sprung part adjustable vertically relative to said unsprung part in direct proportion to the degree of said load, the combination with a measuring arm carried by said sprung part and adapted to measure the distance of said sprung part from said unsprung part between first and second positions corresponding to empty and full-load conditions of the vehicle and having an initial movement relative to said unsprung part from a normal position to said first position, a fulcrumed member carried by said sprung part, a rockable cam element fulcrumed on said member and having a first cam surface at one side of the cam fulcrum and a second cam surface at the opposite side, means connecting said measuring arm to said fulcrumed member comprising a follower for engaging said cam surfaces and displaceable by said first cam surface for actuating said arm from said normal position to said first position and displaceable by said second cam surface for actuating said arm from said first position to said second position, said fulcrumed member comprising fixed means for supporting said cam element to render said first cam surface effective, a stop member fulcrumed in said fulcrumed member and comprising a plurality of shoulders stepped away from its axis for, in different angular positions of said stop member, engagement by said cam element to render said second cam surface effective, means for securing said stop member to said fulcrumed member in each of its different positions, fluid pressure actuated piston means for actuating said fulcrumed member, and brake regulating means for said vehicle adjustable by said piston.

6. In a vehicle load compensating brake equipment for effecting variations in pressure of brake controlling fluid in accordance with the degree of load on the vehicle having a sprung part and an unsprung part, the combination with a casing carried by said sprung part, of a measuring arm for measuring variations in distance between said sprung part and said unsprung part, a linkage for actuating said arm, fluid pressure piston means reciprocable within said casing, a piston rod attached to said piston means, carrier means comprising a lever pivotally connected to said casing and operably engaging said piston rod, a rockable cam element pivotally connected to said lever for actuating said linkage, and an adjustable member also pivotally connected to said lever and rockable to a plurality of locked positions relative thereto, said member having formed therein a plurality of stepped stop shoulders for defining respective stop positions for rockable movement of said cam element relative to said lever in accordance with said locked positions.

7. In a compensating valve device having relay valve means for effecting variations in pressure of delivery brake controlling fluid in accordance with the degree of load on a vehicle between empty and full-load conditions thereof, the combination with a casing, of an equalizing beam operatively connected to said valve means, adjustable fulcrum means rockably supporting said beam and adjustable to positions relative thereto between limit positions corresponding to empty and full-load conditions of said vehicle, said fulcrum means comprising a rigid member reciprocable within said casing, fluid pressure piston means comprising a piston rod reciprocable within said casing, said piston rod having a transverse slot formed therein, a lever member pivotally connected substantially at its mid-point to said casing, said lever member comprising a first arm projecting into said slot and a second arm projecting substantially into the path of travel of said rigid member, said first arm having a face for slidable engagement with a wall of said slot and said second arm having a cam face at one edge thereof, and means pivotally connected to said casing and having spaced apart followers carried thereby for engagement with said cam face and with said rigid member, respectively.

8. In a load compensating brake equipment, the combination with relay valve means for effecting variations in pressure of brake controlling fluid on a vehicle in accordance with the degree of load on the vehicle having a sprung part and an unsprung part, of a measuring arm adapted to be actuated to measure variations in distance between said sprung part and said unsprung part in accordance with degree of load on said vehicle, fluid pressure adjusting piston means operable to effect actuation of said measuring arm, adjustable means interposed between said adjusting piston and said measuring arm for changing the proportionate travel of one relative to the other, lever means operable by said adjusting piston means, adjustable fulcrum means operable by said lever means, an equalizing beam operatively connected to said relay valve means and rockably supported on said adjustable fulcrum means, said fulcrum means being movable relative longitudinally to said beam, and means associated with said lever means for transforming the character of motion of said fulcrum means relative to motion of said piston means.

9. In a load compensating brake equipment for a vehicle having an unsprung part and a load carrying sprung part adjustable vertically relative to said unsprung part in direct proportion to the degree of said load, the combination with a measuring arm carried by said sprung part and adapted to measure the distance of said sprung part from said unsprung part between first and second positions corresponding to empty and full-load conditions of the vehicle, an adjusting piston movable in direct proportion to the degree of load on the vehicle between first and second positions thereof corresponding to empty and full-load conditions of the vehicle, means connecting said piston to said measuring arm for rendering said arm operable by said piston, brake control means comprising an equalizing beam, a fulcrum therefor having an empty position adjacent the center of said fulcrum, a full-load position adjacent one end of said lever and adjustable therebetween to vary the leverage of said beam in direct proportion to the degree of load on the vehicle, a member carrying said fulcrum, a lever fulcrumed intermediate its ends with one end disposed for movement by said piston, a cam on the opposite end of said lever, and a fulcrumed follower carrying rollers engaging, respectively, the fulcrum carrying member and said cam for rendering said piston effective to adjust said fulcrum.

10. In a load compensating brake equipment for a vehicle having an unsprung part and a load carrying sprung part adjustable vertically relative to said unsprung part in direct proportion to the degree of said load, the combination with a measuring arm carried by said sprung part and adapted to measure the distance of said sprung part from said unsprung part between first and second positions corresponding to empty and full-load conditions of the vehicle and having an initial movement relative to said unsprung part from a normal position to said first position, a fulcrumed member carried by said sprung part, a rockable cam element fulcrumed on said member and having a first cam surface at one side of the cam fulcrum for effecting said relative movement of said measuring arm and having a second and aligned cam surface at the opposite side of the cam fulcrum for effecting movement of said measuring arm from said first position to said second position, a fixed stop engageable by said cam element to render said first cam surface effective, an adjustable stop for engagement by said cam element to render said second cam surface effective and adjustable to vary the throw of said second cam surface, a fluid pressure actuated piston movable in straight line relation to variations in load on the vehicle for actuating said fulcrumed member, an adjustable brake control element having an empty position, a full-load position and intermediate partial load positions, a lever fulcrumed intermediate its ends for operatively connecting said piston to said brake control element in the empty positions thereof and for rendering said piston operative upon movement from its empty position in the direction of its full-load position to move said brake control element from its empty position in the direction of its full-load position, and cam means associated with said lever for transforming the movement of said brake control element with respect to that of said piston.

CECIL S. KELLEY.

REFERENCES CITED

The following references are of record in the file of this patent:

UNITED STATES PATENTS

| Number | Name | Date |
|---|---|---|
| 2,390,049 | Baldwin | Dec. 4, 1945 |